Patented Nov. 1, 1932

1,885,591

UNITED STATES PATENT OFFICE

ALBERT COULTHARD AND ERNEST HARRY RODD, OF BLACKLEY, MANCHESTER, ENGLAND, ASSIGNORS TO IMPERIAL CHEMICAL INDUSTRIES LIMITED, OF LONDON, ENGLAND

PROCESS FOR THE MANUFACTURE OF NEW XANTHEN DYES

No Drawing. Application filed June 29, 1929, Serial No. 374,942, and in Great Britain July 7, 1928.

In British Patent No. 314,825, there is described the manufacture of new dyes by condensing 3:7-tetra-alkyl diaminoxanthones with aromatic halogen compounds by means of sodium.

We have now found that the said xanthones can be condensed by means of a halogenated condensing agent such as phosphoryl chloride, phosphoryl bromide, phosphorus pentachloride, phosphorus trichloride or tribromide or carbonyl chloride, which is capable of replacing the ketonic oxygen of the xanthone by halogen, with aromatic compounds containing a reactive nuclear hydrogen atom to give dyes which have not hitherto been described. For example, using secondary or tertiary aromatic amines, which may be represented by the probable formula

wherein $R_1$ represents a phenyl or naphthyl radical, $R_2$ represents a phenyl radical or an alkyl group and $R_3$ represents hydrogen or an alkyl group, and which contain a reactive nuclear hydrogen atom, xanthen dyes are obtained containing 3 substituted amino groups. These dyes which in the form of their hydrochloride salts may be represented by the probable formula

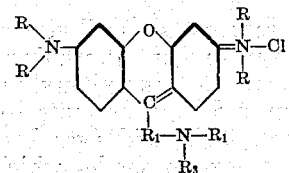

wherein R represents an alkyl group, one $R_1$ represents a phenyl or naphthyl radical while the other $R_1$ represents a phenyl radical or an alkyl group and $R_3$ represents hydrogen or an alkyl group, are obviously much more highly basic than the known Rhodamine dyes and on this account have advantageous dyeing properties.

These new basic dyes dye animal fibres, mordanted cotton and cellulose ester and ether materials, in bright bluish violet shades which are characterized by their remarkable blue fluorescence in ultra violet light. This property distinguishes them from the Rhodamine dyestuffs which show yellow to orange fluorescence in ultra violet light.

Our invention is illustrated but not limited by the following examples, in which the parts are by weight.

*Example 1.*—A mixture of 9.4 parts of 3:7-tetramethyl-diaminoxanthone, 6.3 parts of ehtyl-α-naphthylamine and 10 parts of toluene is warmed to 50° C. and, with good stirring 6.1 parts of phosphoryl chloride are added. After the first vigorous reaction has subsided the mixture is heated and stirred in a boiling water bath for ½ hour. The stiff, brass-colored product is broken up by warming with 100 parts of a 30 per cent solution of common salt. The dye floats to the surface as a tar which hardens on cooling, and is filtered off and washed. The yield is nearly quantitative. The dye is sparingly soluble in cold water, readily in hot, and dyes tanninmordanted cotton, wool and cellulose acetate in bright magenta shades.

The dye is a green solid, readily soluble in warm water to a deep magenta solution with green fluorescence. It forms a brown solution in concentrated sulphuric acid. On dilution with water the solution becomes pink and has a marked orange fluorescence.

Alkalies precipitate the color base as a brown precipitate from strong aqueous solutions of the dye.

The probable formula of the new dye thus obtained when in the form of its hydrochloride salt is

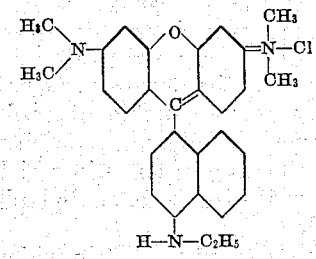

*Example 2.*—Using 7.6 parts of p-tolyl-m-phenetidine instead of ethyl-α-naphthylamine, and proceeding as in Example 1, a nearly quantitative yield of a more sparingly soluble dye, which can be sulphonated is obtained.

The dye is a dark green granular powder, very sparingly soluble in cold water, but readily in hot forming a deep magenta solution. Alkalies precipitate the color base as a magenta colored gelatinous solid. The dye gives a brown solution in concentrated sulphuric acid, on dilution the dye separates as a purple gelatinous precipitate. Concentrated hydrochloric acid precipitates the dye similarly from aqueous solutions. The probable formula of the new dyestuff thus obtained is as hydrochloride:

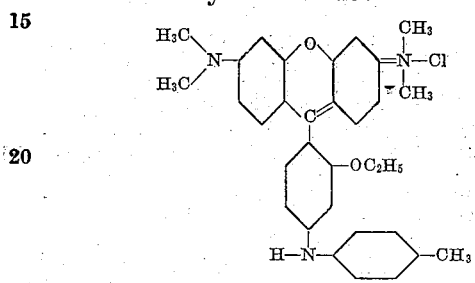

Other amines which give basic dyes in high yield include, phenyl-α-naphthylamine, dimethylaniline, p-tolyl-α-naphthylamine, N-methyldiphenylamine and diethyl-m-toluidine.

*Example 3.*—If 11.2 parts by weight of 3:7-tetraethyl-diaminoxanthone are substituted for the methyl homologue of Example 1, the reaction proceeds similarly. The dye (obtained in nearly quantitative yield) gives a brighter and slightly bluer shade on acetate silk than that of Example 1.

The reactions of the dyestuff are very similar to those of the dyestuff of Example 1.

What we claim and desire to secure by Letters Patent is:—

1. In the manufacture of new basic dyes of the xanthen type, the process which comprises condensing a 3:7-tetra-alkyldiaminoxanthone with an aromatic amine having the probable formula

wherein $R_1$ represents a phenyl or naphthyl radical, $R_2$ represents a phenyl radical or an alkyl group and $R_3$ represents hydrogen or an alkyl group and containing a reactive nuclear hydrogen atom, the said condensation being effected in the presence of a halogenated condensing agent capable of replacing the ketonic oxygen of the xanthone by halogen.

2. The process of claim 1 in which the condensing agent is a halogenated phosphorus compound.

3. The process of claim 1 in which the condensing agent is phosphoryl chloride.

4. In the manufacture of new basic dyes of the xanthen type, the process which comprises condensing a 3:7-tetra-alkyldiaminoxanthone with an amine selected from a class consisting of secondary and tertiary amines having a reactive nuclear hydrogen atom, the condensation being effected in the presence of a halogenated condensing agent capable of replacing the ketonic oxygen of the xanthone by halogen.

5. The process of claim 4 in which the condensing agent is phosphoryl chloride.

6. In the manufacture of new basic dyes of the xanthen type, the process which comprises condensing 3:7 - tetramethyl-diaminoxanthone with an aromatic amine having the probable formula

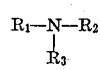

wherein $R_1$ represents a phenyl or naphthyl radical, $R_2$ represents a phenyl radical or an alkyl group and $R_3$ represents hydrogen or an alkyl group, and containing a reactive nuclear hydrogen atom, the said condensation being effected in the presence of phosphoryl chloride.

7. In the manufacture of new basic dyes of the xanthen type, the process which comprises condensing a 3:7-tetra-alkyldiaminoxanthone with ethyl-alpha-naphthylamine, the said condensation being effected in the presence of phosphoryl chloride.

8. In the manufacture of new basic dyes of the xanthen type, the process which comprises condensing a 3:7-tetra-alkyldiaminoxanthone with para-tolyl-meta-phenetidine, the said condensation being effected in the presence of phosphoryl chloride.

9. As new products, new basic dyes of the xanthen type having in the form of the hydrochloride the probable formula

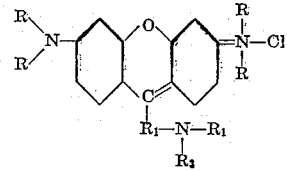

wherein R represents an alkyl group, one $R_1$ represents a phenyl or naphthyl radical while the other $R_1$ represents a phenyl radical or an alkyl group and $R_3$ represents hydrogen or an alkyl group, the said dyes dyeing tannin mordanted cotton in shades which exhibit a blue fluorescence when exposed to ultra violet rays.

10. As new products, new basic dyes of the xanthen type having in the form of the hydrochloride the probable formula

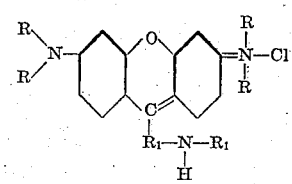

wherein R represents an alkyl group, one $R_1$ represents a phenyl or naphthyl radical while the other R₁ represents a phenyl radical or an alkyl group, the said dyes dyeing tannin mordanted cotton in shades which exhibit a blue fluorescence when exposed to ultra violet rays.

11. As new products, new basic dyes of the xanthen type having in the form of the hydrochloride the probable formula

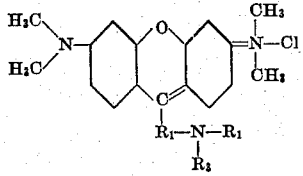

wherein one R₁ represents a phenyl or naphthyl radical while the other R₁ represents a phenyl radical or an alkyl group and R₃ represents hydrogen or an alkyl group, the said dyes dyeing tannin mordanted cotton in shades which exhibit a blue fluorescence when exposed to ultra violet rays.

12. As new products, new basic dyes of the xanthen type having in the form of the hydrochloride the probable formula

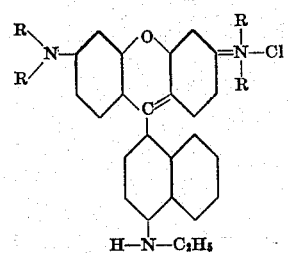

wherein R represents an alkyl group, the said dyes dyeing tannin mordanted cotton in shades which exhibit a blue fluorescence when exposed to ultra violet rays.

13. As new products, new basic dyes of the xanthen type having in the form of the hydrochloride the probable formula

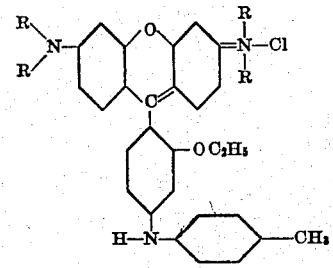

wherein R represents an alkyl group, the said dyes dyeing tannin mordanted cotton in shades which exhibit a blue fluorescence when exposed to ultra violet rays.

14. As a new product, the new basic dye of the xanthen type having in the form of the hydrochloride the probable formula

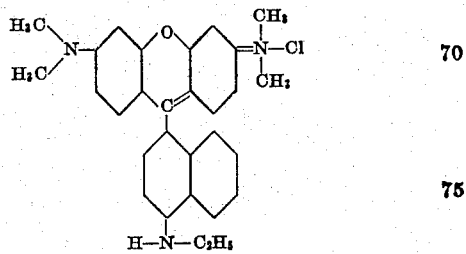

and being sparingly soluble in cold water, readily soluble in hot water and dyeing tannin mordanted cotton, wool and cellulose acetate in bright magenta shades, the said dye dyeing tannin mordanted cotton in shades which exhibit a blue fluorescence when exposed to ultra violet rays.

15. As a new product, the new basic dye of the xanthen type having in the form of the hydrochloride the probable formula

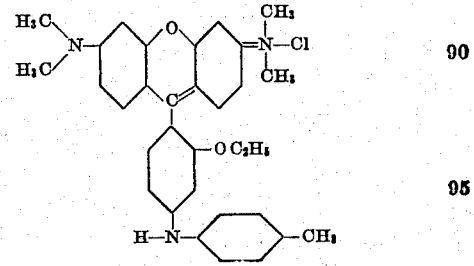

the said dyes dyeing tannin mordanted cotton in shades which exhibit a blue fluorescence when exposed to ultra violet rays.

In testimony whereof we affix our signatures.

ALBERT COULTHARD.
ERNEST HARRY RODD.

CERTIFICATE OF CORRECTION.

Patent No. 1,885,591.                              November 1, 1932.

ALBERT COULTHARD ET AL.

It is hereby certified that error appears in the printed specification of the above numbered patent requiring correction as follows: Page 1, line 59, for "ehtyl" read "ethyl", and line 60, for "to" read "at"; and that the said Letters Patent should be read with these corrections therein that the same may conform to the record of the case in the Patent Office.

Signed and sealed this 10th day of January, A. D. 1933.

M. J. Moore, (Seal)                                  Acting Commissioner of Patents.